(12) United States Patent
Zachary

(10) Patent No.: US 10,272,998 B2
(45) Date of Patent: Apr. 30, 2019

(54) VARIABLE PITCH PROPELLER APPARATUS AND VARIABLE THRUST AIRCRAFT USING SAME

(71) Applicant: Kyriacos Zachary, Newark, DE (US)

(72) Inventor: Kyriacos Zachary, Newark, DE (US)

(73) Assignee: BLAINJETT AVIATION LLC, Frankfurt (DE)

( * ) Notice: Subject to any disclaimer, the term of this patent is extended or adjusted under 35 U.S.C. 154(b) by 0 days.

(21) Appl. No.: 16/075,139

(22) PCT Filed: May 18, 2017

(86) PCT No.: PCT/US2017/033394
§ 371 (c)(1),
(2) Date: Aug. 2, 2018

(87) PCT Pub. No.: WO2017/201324
PCT Pub. Date: Nov. 23, 2017

(65) Prior Publication Data
US 2018/0370626 A1    Dec. 27, 2018

Related U.S. Application Data

(60) Provisional application No. 62/392,019, filed on May 18, 2016.

(51) Int. Cl.
*B64C 11/32* (2006.01)
*B64C 29/00* (2006.01)
(Continued)

(52) U.S. Cl.
CPC .......... *B64C 29/0033* (2013.01); *B64C 11/32* (2013.01); *B64C 11/36* (2013.01);
(Continued)

(58) Field of Classification Search
CPC ..... B64C 29/0033; B64C 11/30; B64C 11/32; B64C 11/34; B64C 11/36; B64C 39/024;
(Continued)

(56) References Cited

U.S. PATENT DOCUMENTS 4,704,067 A    11/1987 Fisher
5,364,231 A    11/1994 Eick et al.
(Continued)

OTHER PUBLICATIONS

International Search Report and Written Opinion for PCT/US17/033394.

*Primary Examiner* — Carlos A Rivera
*Assistant Examiner* — Sang K Kim
(74) *Attorney, Agent, or Firm* — Invention to Patent Services; Alex Hobson

(57) ABSTRACT

A variable pitch propeller apparatus enables a propeller to have different pitch angles in one revolution about the drive shaft. The propellers are coupled to a race that is flexible and actuated into different offset distances by a race-deflector. A race-linkage may extend between the race and the propeller or drive shaft coupler to rotate the propeller to a pitch angle as determined by the offset distance to the race. A race-linkage may incorporate one or more wheels that engages with the race and rolls along the race and about the drive shaft. An aircraft utilizing one or more of the variable pitch propeller apparatus may be able to produce downward thrust for vertical take-off and landing and transition to forward flight. The pitch of the propellers may be changed from take-off to flight to provide the required propulsion for the aircraft.

24 Claims, 10 Drawing Sheets

(51) Int. Cl.
*B64C 39/02* (2006.01)
*B64C 11/36* (2006.01)
(52) U.S. Cl.
CPC ...... *B64C 39/024* (2013.01); *B64C 2201/021* (2013.01); *B64C 2201/027* (2013.01); *B64C 2201/104* (2013.01); *B64C 2201/108* (2013.01); *B64C 2201/165* (2013.01)
(58) Field of Classification Search
CPC ........ B64C 2201/021; B64C 2201/027; B64C 2201/104; B64C 2201/108; B64C 2201/165
See application file for complete search history.

(56) References Cited

U.S. PATENT DOCUMENTS

| | | | |
|---|---|---|---|
| 9,567,070 B2* | 2/2017 | Shundo | B64C 29/0033 |
| 9,599,121 B2* | 3/2017 | Fabre | B64C 11/306 |
| 9,663,236 B1* | 5/2017 | Shiosaki | B64D 27/26 |
| 2005/0079053 A1 | 4/2005 | Perkinson | |
| 2008/0095627 A1 | 4/2008 | Castillo | |
| 2017/0144746 A1* | 5/2017 | Schank | B64C 11/28 |
| 2017/0313405 A1* | 11/2017 | Petellaz | B64C 11/06 |
| 2019/0002085 A1* | 1/2019 | Choi | F16F 15/121 |

* cited by examiner

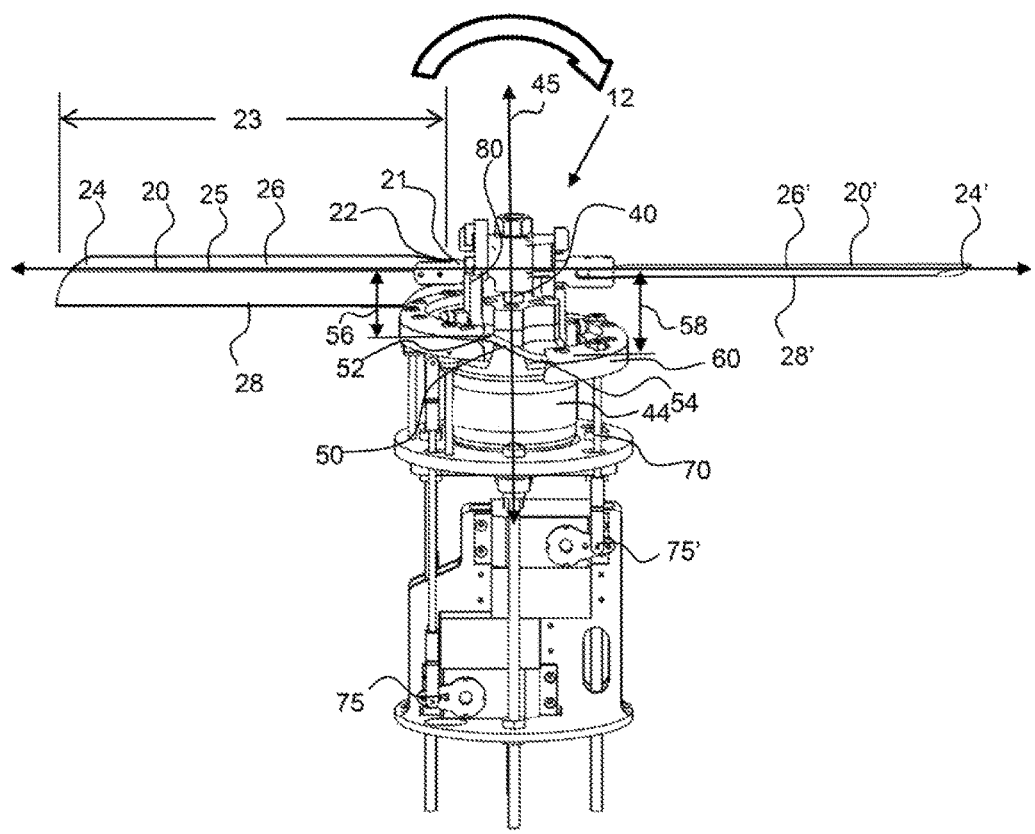
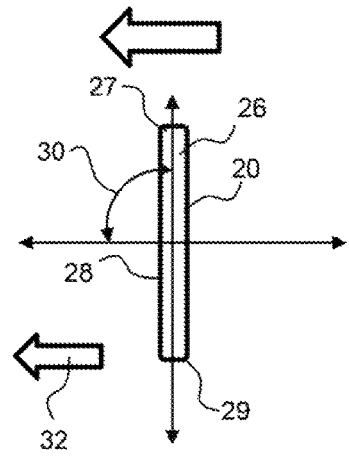
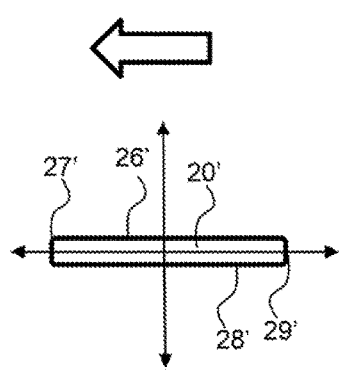
FIG. 1
Phase 1
FIG. 2
FIG. 3

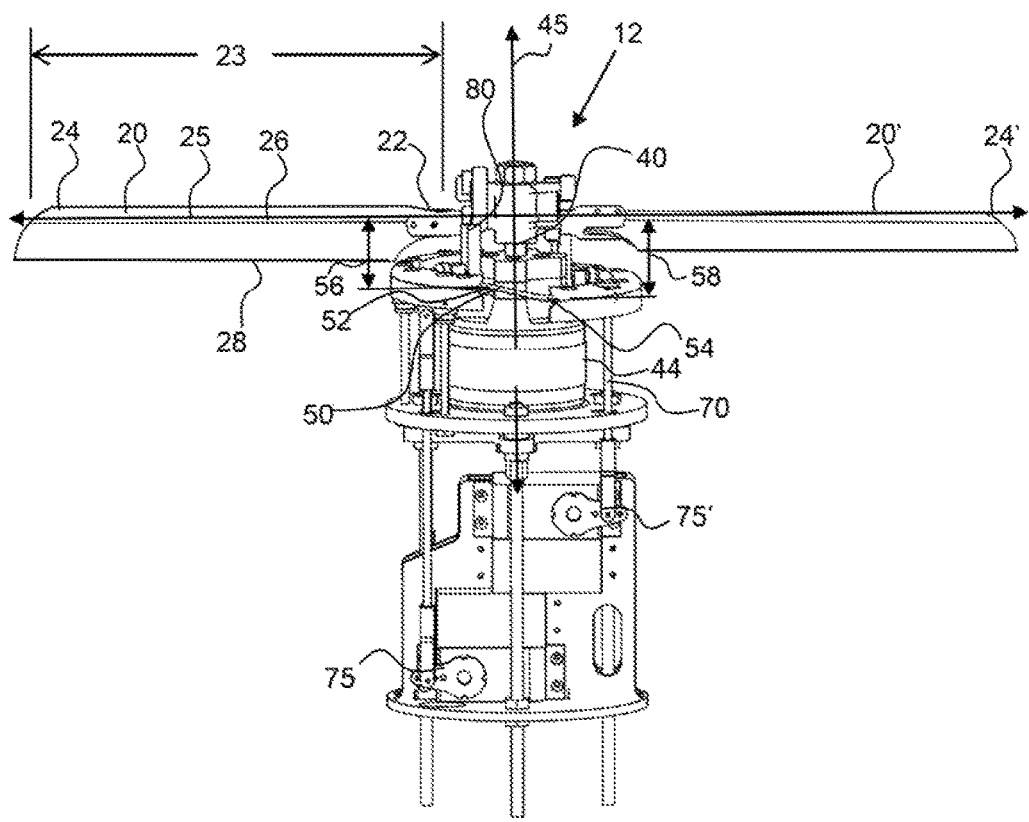
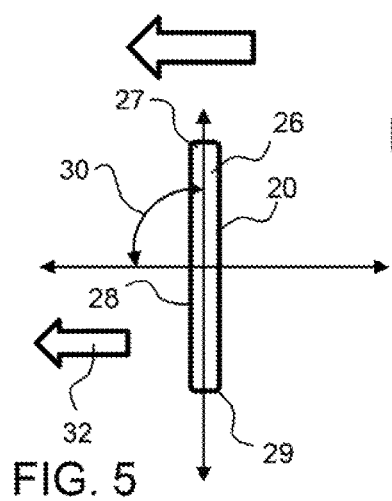
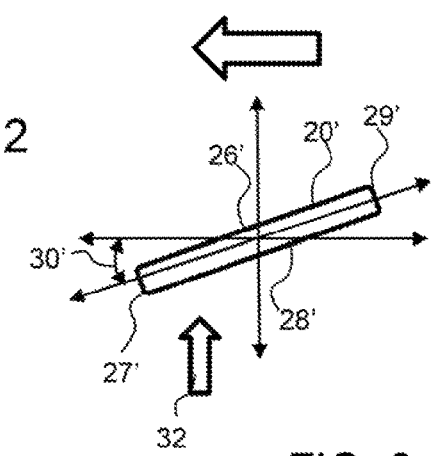

Phase 3

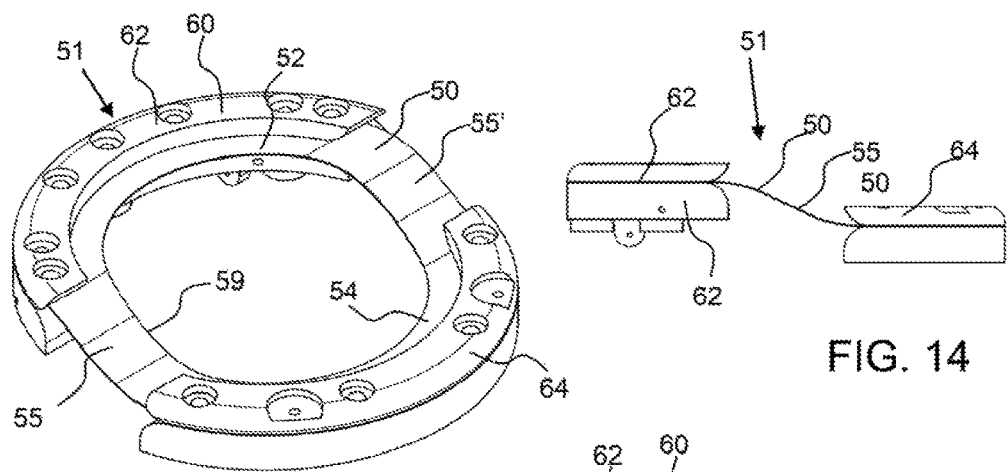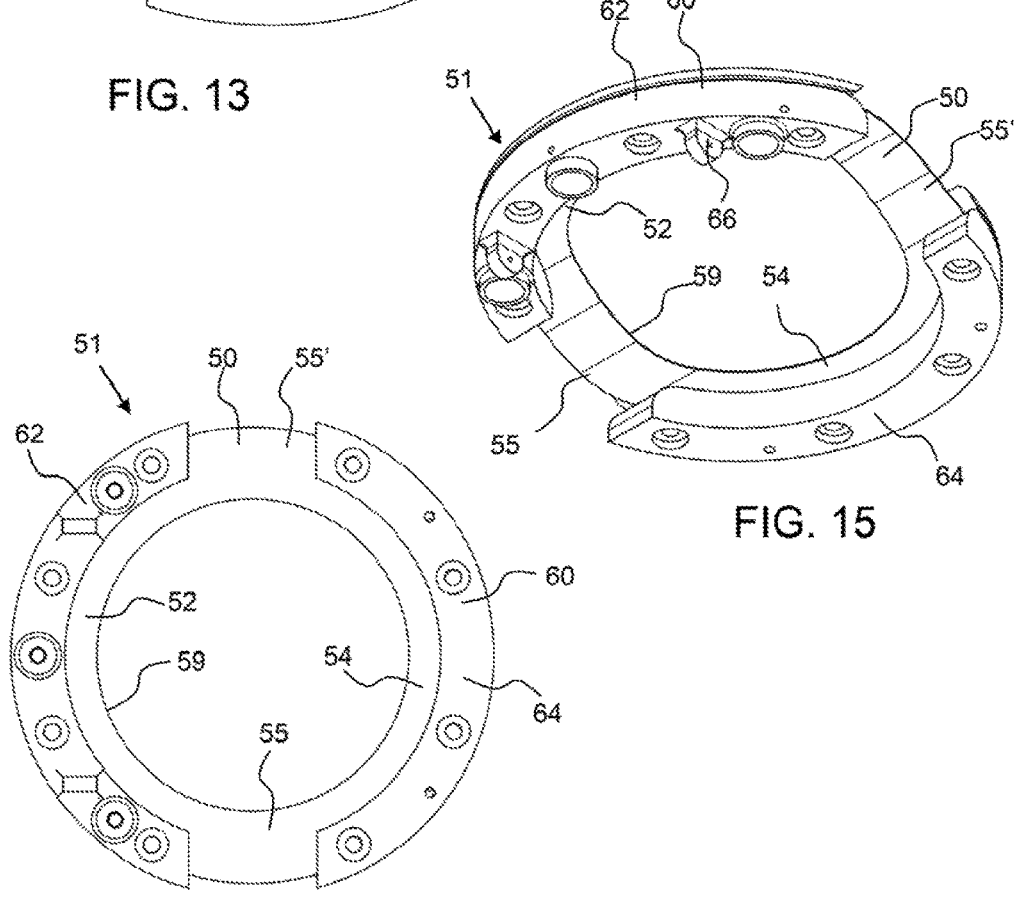

VARIABLE PITCH PROPELLER APPARATUS AND VARIABLE THRUST AIRCRAFT USING SAME

CROSS REFERENCE TO RELATED APPLICATIONS

This application claims the benefit of priority to U.S. provisional patent application No. 62/392,019, filed on May 18, 2016; the entirety of which is hereby incorporated by reference herein.

BACKGROUND OF THE INVENTION

Field of the Invention

The present invention relates to variable pitch propeller apparatus and variable thrust aircraft incorporating said variable pitch propeller apparatus.

Background

Fixed wing aircraft require a runway for take-off, thereby limiting locations where they can take-off and land. Rotary wing aircraft have a shorter range than fixed wing aircraft because of inefficiencies and fuel consumption. Their top speed is limited to about 250 miles per hour by some factors including, "flapback" and "airflow reversal".

SUMMARY OF THE INVENTION

The invention is directed to a variable pitch propeller apparatus and an aircraft incorporating said variable pitch propeller apparatus having variable thrust direction capabilities. An exemplary variable thrust aircraft utilizing a variable pitch propeller enables the aircraft to combine the functions of a fixed wing aircraft with the functions of a rotary wing aircraft without the drawbacks associated with runways, top-speed and range. An exemplary variable pitch propeller apparatus has one or more propellers that has an adjustable propeller pitch angle. An exemplary propeller may be operated in an initial pitch angle during take-off to provide lift and then change pitch angle after take-off to provide more forward propulsion. An exemplary variable pitch propeller may vary pitch angle about a single revolution, wherein the propeller has a first pitch angle over a portion of rotation and a second pitch angle over a second portion of rotation. A variable pitch propeller may thereby be able to provide both downward thrust, or lift of the aircraft, and forward propulsion in one revolution. In an exemplary embodiment, a variable thrust aircraft comprises one or more variable pitch propeller apparatus to provide thrust in different direction by changing the pitch angle of the propeller. An exemplary variable thrust aircraft comprises two or more variable pitch propeller apparatus which may operate or rotate at different pitch angles at the same time, thereby providing two different thrust simultaneously.

An exemplary variable pitch propeller apparatus comprises a drive shaft that rotates about a drive shaft length axis or rotational axis, and one or more propellers that are rotated by the drive shaft. An exemplary propeller comprises, a coupled end that is coupled to said drive shaft, an extended end that is opposing said coupled end; a length from the coupled end to the extended end; a length axis that extends substantially perpendicularly to a rotational axis of the drive shaft; a first side; and a second side. A propeller may be directly attached to the drive shaft but in most cases, is attached to a drive shaft coupler that extends between the propeller and the drive shaft. The propellers are rotated about their length axis by a race-linkage that extends from a flexible race and is coupled with the propeller, such as with the drive shaft coupler. The flexible race can be actuated to change an offset distance between the race and the propeller, or actuate the race-linkage to rotate the propeller. A race-linkage may couple with a cam that translates motion of the race-linkage into rotational motion.

A flexible race may be a ring or have a circular inner ring, that extends around the drive shaft that allows a race-coupler, such as a wheel or a pair of wheels to roll around the race. In an exemplary embodiment, a race-coupler is a pair of wheels, one that rolls on the top surface of the race and one that rolls along the bottom surface of the race. A flexible race may be flexed or deformed to by a race deflector to produce a first race portion and a second race portion, having different offset distances that forces the race-linkage to move and thereby rotate the propeller about the length axis. A race may deflect from the first portion to the second portion over a race transition portion. A race may be deflected to have any number of offset shapes, including continuously variable, wherein the race has a sinusoidal shape around one revolution, with respect to the offset distance. A race assembly may comprise a flexible race in a housing and this housing may be flexible as well, or be rigid and segmented to allow deflection of the race to rotate the propeller. A housing may be disjointed, having gaps between a first housing portion and second housing portion. A race deflector may couple with the race or race housing and force the race to change the offset distance.

In an exemplary embodiment, the offset distance is changed such that it is substantially uniform about the rotation of the race. The offset distance may be changed from a first to a second offset distance, wherein the entire race or race assembly is moved up or down along the length or rotational axis of the drive shaft. The variable pitch propeller apparatus of claim 1, wherein the first and second offset distances are the same.

An exemplary race deflector comprises an extension that actuates to move the flexible race. The deflector may be coupled with a motor, such as a servo-motor to provide accurate control of the displacement of the flexible race. In an exemplary embodiment, the race deflector is a rod that couples with the race housing to force it up and down.

An exemplary variable pitch propeller apparatus may comprise one, two, three, four or more, or six or more propellers. The propeller has a length from a coupled end to an extended end and may be planar in shape, or airfoil shaped, having a rounded leading edge, a contoured surface and a substantially flat opposing surface. The top and bottom surfaces of the propeller may be contoured. For example, a propeller may have an airfoil shape with a top surface being contoured and the bottom surface being flat.

An exemplary variable thrust aircraft comprises a variable pitch propeller apparatus, as described herein. An exemplary variable thrust aircraft comprises a pair of wings and at least one variable pitch propeller apparatus, such as a variable pitch propeller apparatus coupled to each of the wings. In an exemplary embodiment, each wing comprises a variable pitch propeller apparatus which may both point forward, wherein the length axis of the drive motor extends forward from the wing, and may be substantially parallel with the length axis of the aircraft, such as within about 20 degrees. In another embodiment, a variable thrust aircraft comprises two variable pitch propeller apparatus on each wing. Each wing may have a forward facing variable pitch propeller apparatus and a backward facing variable pitch propeller apparatus. In still another embodiment, a variable thrust aircraft comprises a variable pitch propeller apparatus that has an upward orientation, wherein the drive shaft length axis extend upward from the wing, or substantially perpendicularly to the wing to plane, or wing length axis. In an exemplary embodiment, a variable thrust aircraft comprises an upwardly oriented variable pitch propeller apparatus on each wing, such as proximal to the extended end of the wings.

The variable pitch propeller apparatus may be operated to provide upward lift for vertical take-off and landing and may be then switched to a forward propulsion mode, wherein the propellers are rotated to switch from upward lift to forward propulsion or a combination of both. One of the variable pitch propeller apparatus may be operated to produce a first type of force or thrust and a second variable pitch propeller apparatus may be used to produce a second type of force or thrust, such as lift and forward propulsion. In addition, as described herein, the pitch angle of the propellers may be changed around a single revolution, thereby allowing a single propeller to provide some lift and forward propulsion in one revolution.

The pitch angle of a variable pitch propeller apparatus may be changed as much as 90 degrees or more, or even 180 degrees or more. The pitch angle may vary from positive 90 degrees to negative 90 degrees, for example.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

FIG. 1 shows a perspective view of an exemplary variable pitch propeller apparatus having a pair of propeller that are rotated about a length axis by a race linkage that extends from the flexible race and is coupled with the propeller. The first propeller is rotated down.

FIG. 2 shows an end view of the first propeller having a positive propeller pitch angle to produce a downward thrust.

FIG. 3 shows an end view of the second propeller having substantially no propeller pitch angle to produce little drag and no thrust.

FIG. 4 shows a perspective view of an exemplary variable pitch propeller apparatus having a pair of propeller that are rotated about a length axis by a race linkage that extends from the flexible race and is coupled with the propeller. The first propeller is rotated down.

FIG. 5 shows an end view of the first propeller having a positive propeller pitch angle to produce a downward thrust.

FIG. 6 shows an end view of the second propeller having a negative propeller pitch angle to produce rearward thrust.

FIG. 13 shows a top perspective view of an exemplary race assembly.

FIG. 14 shows a side view of an exemplary race assembly.

FIG. 15 shows a bottom perspective view of an exemplary race assembly.

FIG. 16 shows a bottom view of an exemplary race assembly.

Figure 7:
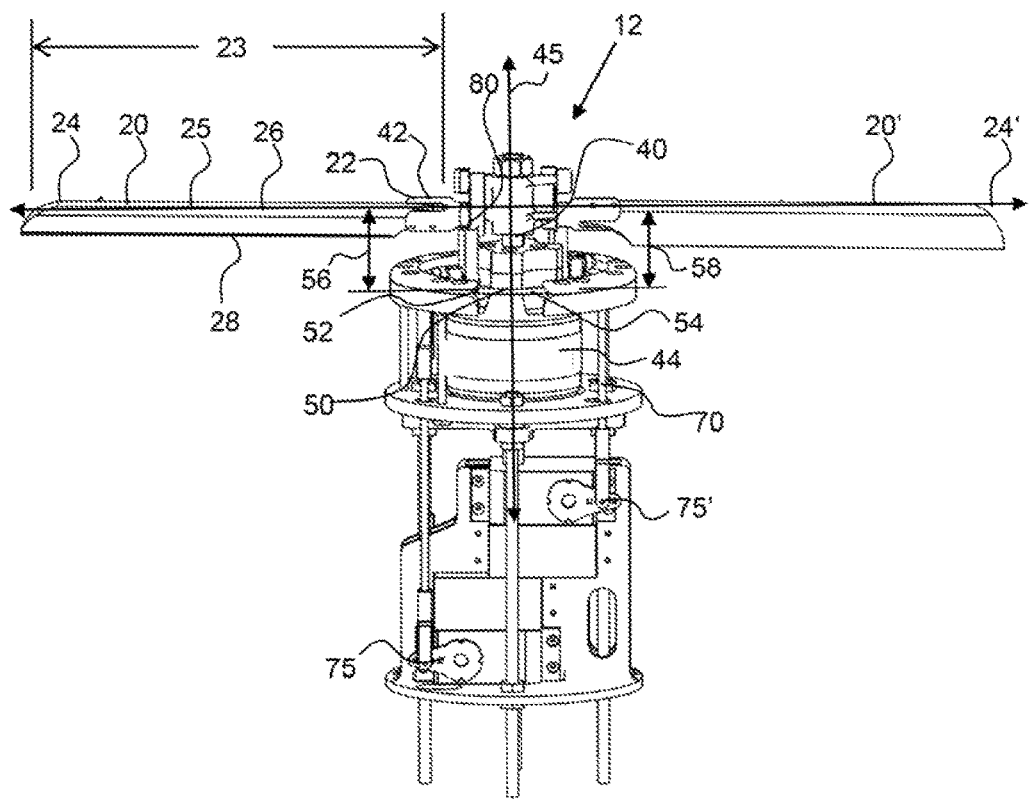
FIG. 7 shows a perspective view of an exemplary variable pitch propeller apparatus having a pair of propellers that are rotated about a length axis by a race linkage that extends from the flexible race and is coupled with the propeller. Both propellers are rotated slightly down.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Definitions

A flexible race is defined herein as a race that can move from a first offset distance to second offset distance about the circumference of the race and has a transition portion from a first race portion at a first offset distance to a second race portion at a second offset distance. A flexible race is configured to hold a pitch angle of the propeller over at least a portion of the race or over the entire rotation about the race.

As defined herein, substantially aligned with a length axis is defined as being within about 20 degrees of parallel with the length axis. For example, a variable pitch propeller is substantially aligned with the length axis of an aircraft when the drive shaft length axis of the variable pitch propeller is within about 20 degrees of parallel with the length axis of the aircraft.

As shown in FIG. 1, an exemplary variable pitch propeller apparatus 12 has a pair of propeller 20, 20' that are rotated about a length axis 25 by a race linkage 80 that extends from the flexible race 50 and is coupled with the propeller. The propeller has a length 23 from a coupled end 22 to the extended end 24. The propeller has a length axis 25 that extends along the length and is generally perpendicular to the length axis 45 of the drive shaft 40. The propeller has a first side 26 and an opposing second side 28. The first propeller 20 is rotated about the length axis of the propeller to have a positive pitch angle of about 90 degrees, wherein the leading edge 27 is raised with respect to the trailing edge 29. As shown in FIG. 2, the propeller 20, is substantially vertical wherein the plan of the propeller is vertical or aligned with the length axis of the drive shaft. The second propeller 20' has substantially no pitch angle, wherein the leading edge 27' and trailing edge 29' are in line with the direction of rotation. The linkage 80 is coupled with the propeller, such as to the propeller directly or to a propeller coupler 21 that couples the propeller to the drive shaft 40. The linkage is coupled with the race 50 and rotates around the race. The race 50 is not planar, and the linkage therefore will be forced by the change in position of the race as it rotates along the race. The race has a first race portion 52 with a first offset distance 56 and a second race portion 54 with a second offset distance 58 that is different from the first offset distance. The offset distance is the distance from the race to the length axis of the propeller measured normal to the rotational plane of the propeller or along the drive shaft length axis. As the offset distance changes, the race-linkage is forced up or down and therefore rotates the propeller about the length axis of the propeller. The linkage has a length from the race-end—where it is coupled with the race to the propeller end. The linkage may have a pin connection at the propeller-end to allow pivotal rotation. The flexible race 50 is moved by a race deflector 70 that is coupled with the race and with a deflector actuator 75. As shown in FIG. 1, a race deflector is a rod that extends from the deflector actuator to the race housing 60, which moves the race. The race may be a ring shape having an inner aperture, an inner edge and circumference. The race deflector may move the race without interfering with the race-linkage contact proximal to the inner edge of the race. The race deflector has produced a first offset distance 56 that is less than the second offset distance 58.

When the variable pitch propeller is oriented substantially in line with the length axis of an aircraft, the pitch angle shown in FIG. 2 will create downward thrust, or lift of the aircraft and the pitch angle shown in FIG. 3 will create little to no thrust in a Phase 1 orientation. A Phase 1 orientation will lift the aircraft to prepare it for take-off. As shown in FIG. 1, the drive shaft 40 is driven by a drive-motor 44, such as an electric motor. In FIG. 2, the first propeller 20 has a positive pitch angle 30 of about 90 degrees which creates thrust having a thrust direction 32 that is perpendicular to the drive shaft length axis. When the variable pitch propeller is oriented substantially in line with the length axis of an aircraft, the pitch angle shown in FIG. 2 will create downward thrust, or lift of the aircraft. This downward thrust will enable the aircraft to take-off and land vertically. The direction of motion is indicated by the bold horizontal arrow. As shown in FIG. 3, the second propeller has no pitch angle and therefore will create little thrust or drag as it rotates. Again, when the variable pitch propeller is oriented substantially in line with the length axis of an aircraft, the pitch angle shown in FIG. 3 will create little to no thrust in the downward or upward direction. In Phase 1, the variable pitch propeller is creating mainly lift when oriented in line with the length direction of an aircraft.

As shown in FIG. 4, an exemplary variable pitch propeller apparatus 12 has a pair of propellers 20, 20', that are rotated about a length axis 25, 25' respectively, by a race linkage 80 that extends from the flexible race 50 and is coupled with the propeller. The first propeller 20 is rotated to have a positive pitch angle 30, as shown in FIG. 5 and propeller 20' is rotated to have a negative pitch angle 30', as shown in FIG. 6. When the variable pitch propeller is oriented substantially in line with the length axis of an aircraft, the pitch angle shown in FIG. 5 will create downward thrust, or lift of the aircraft and the pitch angle shown in FIG. 6 will create rearward thrust in a Phase 2 orientation. Phase 2 orientation will transition the aircraft from a hover to forward flight. The direction of motion of the propeller is indicated by the bold horizontal arrow. The leading edge 27 and the trailing edge 29 will move in unison downward to create lift as shown in FIG. 5. FIG. 6 shows an end view of the second propeller having a negative propeller pitch angle to produce rearward thrust to propel the aircraft forward when the variable pitch propeller is oriented substantially in line with the length axis of an aircraft. The direction of motion is indicated by the bold horizontal arrow. The leading edge 27 of the propeller 20 is lower than the trailing edge 29 of the propeller which creates a negative propeller pitch angle and a rearward thrust 32, as indicated by the bold upward arrow.

Figure 8:
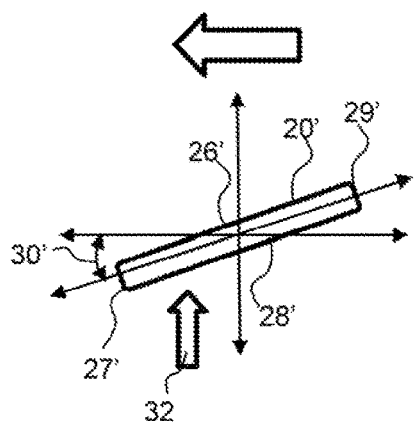
FIG. 8 shows an end view of the first propeller having a very low positive propeller pitch angle to produce little rearward thrust.
Figure 9:
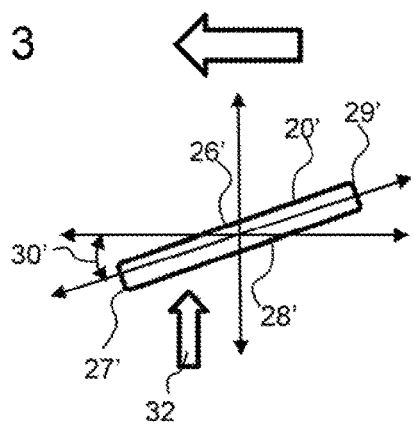
FIG. 9 shows an end view of the second propeller having a very low positive propeller pitch angle to produce little rearward thrust.

As shown in FIG. 7, an exemplary variable pitch propeller apparatus 12 has a pair of propellers 20, 20', that are rotated about a length axis 25, 25' respectively, by a race linkage 80 that extends from the flexible race 50 and is coupled with the propeller. The race linkage is coupled to the drive shaft coupler 42, that couples the drive shaft 40 to the propeller. When the variable pitch propeller is oriented substantially in line with the length axis of an aircraft, the pitch angle shown in both FIG. 8 and FIG. 9 will create rearward thrust, to propel the aircraft through the air in a Phase 3 orientation. Phase 3 orientation will propel the aircraft through the air and the wings will provide the lift as the air moves over the airfoil of the wing. FIG. 8 shows an end view of the first propeller 20 having a negative propeller pitch angle 30 to produce a rearward thrust 32. The direction of motion is indicated by the bold horizontal arrow. The leading edge 27 of the propeller 20 is higher than the trailing edge 29 of the propeller which creates a positive propeller pitch angle 30 and a rearward thrust. FIG. 9 shows an end view of the second propeller 20 having a negative propeller pitch angle 30 to produce rearward thrust 32. The direction of motion is indicated by the bold horizontal arrow. The leading edge 27 of the propeller 20 is lower than the trailing edge 29 of the propeller which creates a negative propeller pitch angle and the thrust, as indicated by the bold upward arrow.

Figure 10:
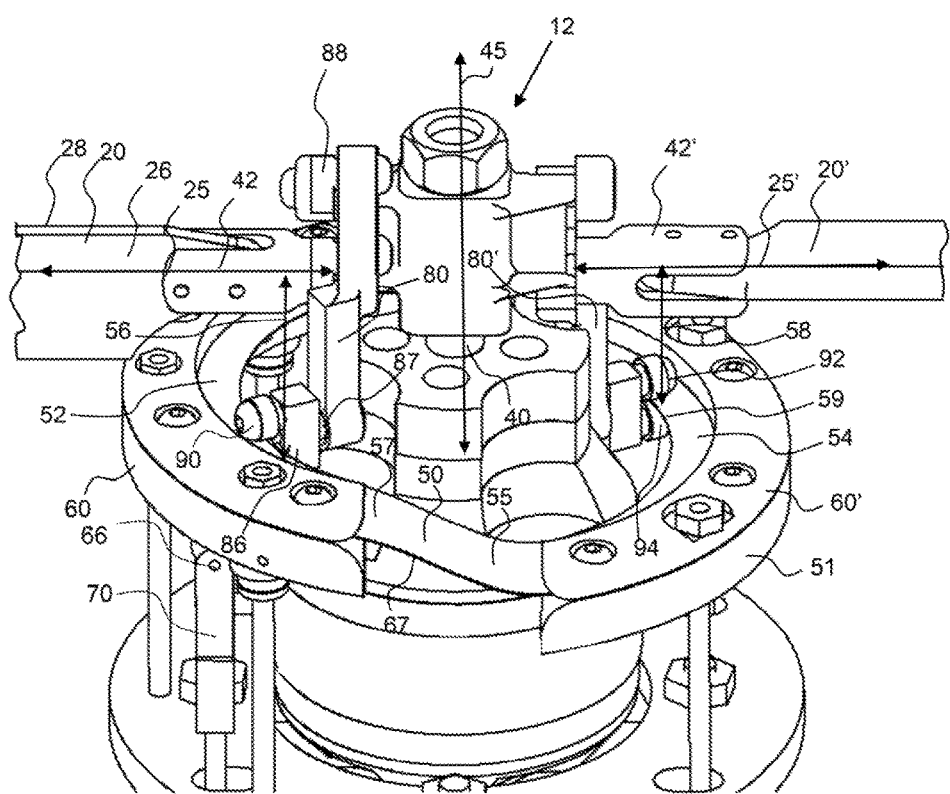
FIG. 10 shows a perspective top view of a portion of an exemplary variable pitch propeller apparatus having a flexible race and a pair of race coupler wheels that roll along the race as it transitions from a first offset distance to a second offset distance.
Figure 11:
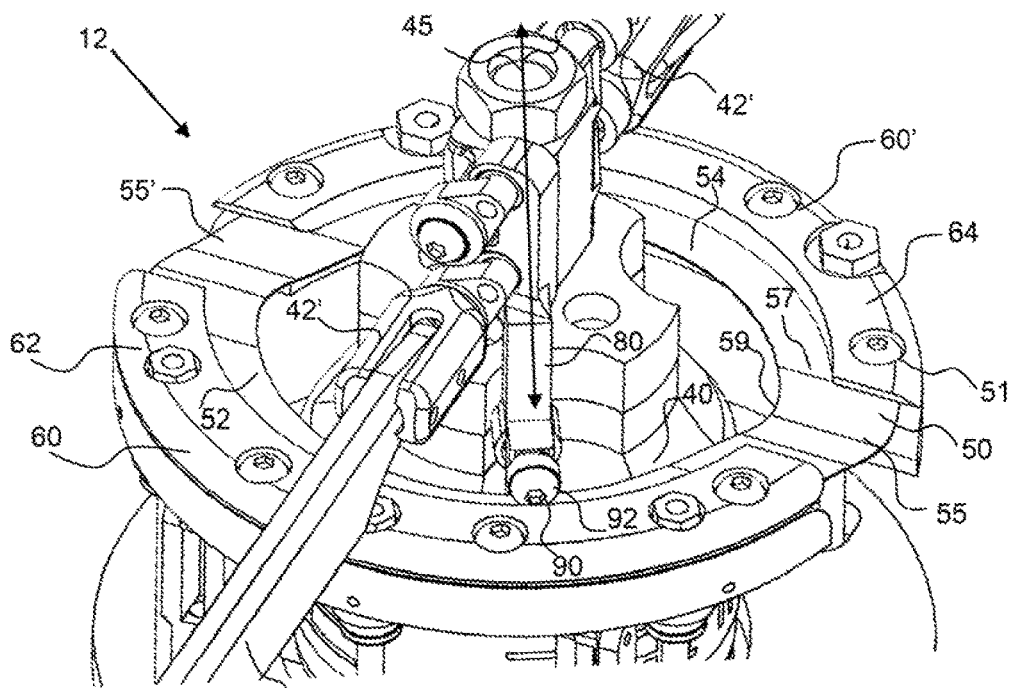
FIG. 11 shows a perspective top view of a portion of an exemplary variable pitch propeller apparatus having a flexible race assembly.
Figure 12:
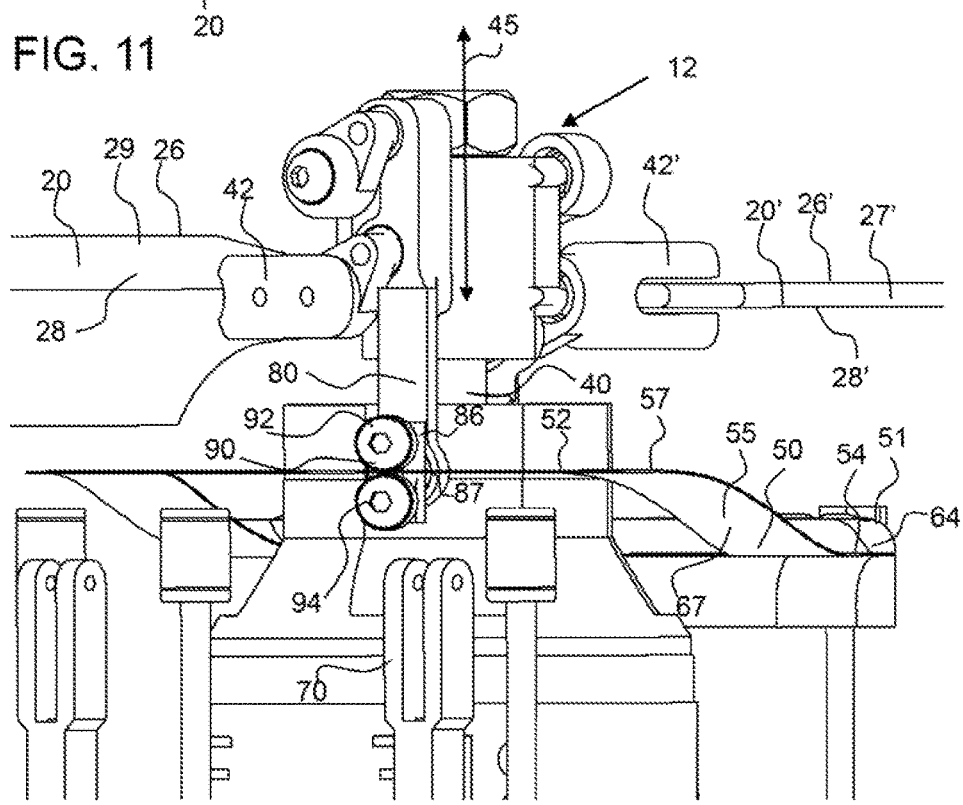
FIG. 12 shows a front view of a portion of an exemplary variable pitch propeller apparatus having a flexible race with a transition portion from a first offset distance to a second offset distance and a pair of race coupler wheels that are coupled with the race linkage and the propellers to rotate the propeller about a length axis.
Figure 20:
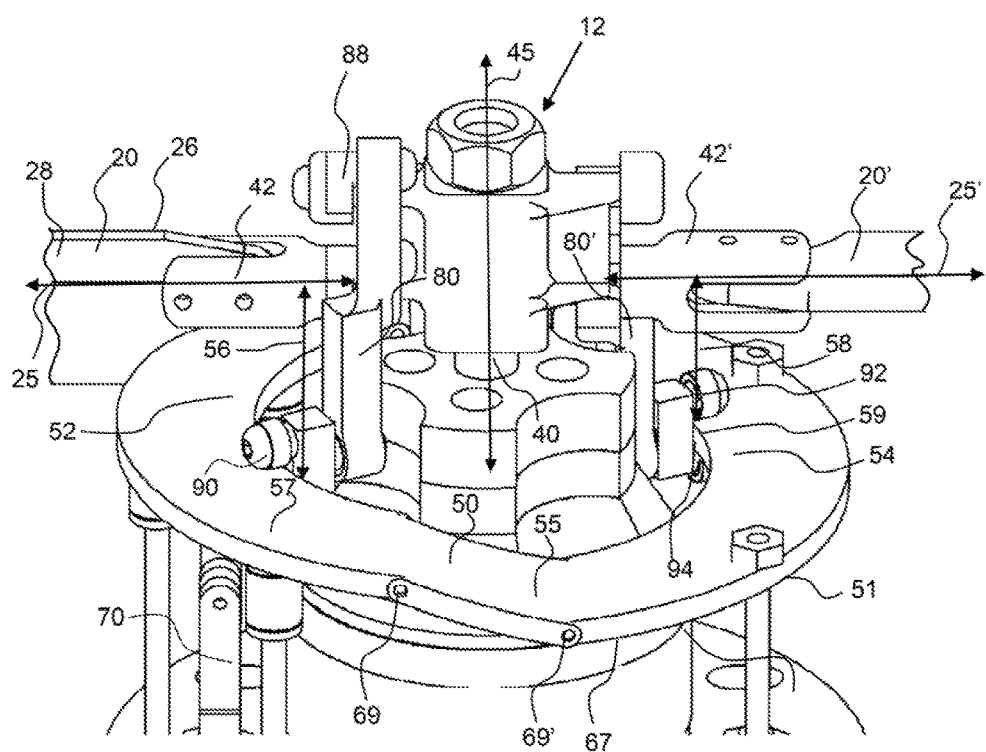
FIG. 20 shows a perspective top view of a portion of an exemplary variable pitch propeller apparatus having a hinged race and a pair of race coupler wheels that roll along the race as it transitions from a first offset distance to a second offset distance.

Referring now to FIGS. 10 through 12 and 20, an exemplary variable pitch propeller apparatus 12 has a race assembly 51 having a flexible race 50 that transitions from a first race portion 52 to a second race portion 54 over a race transition portion 55. A race coupler 90, a pair of coupler wheels 92, 94, roll along the race as it transitions from a first offset distance 56 to a second offset distance 58. As shown in FIG. 10, the first offset distance is smaller than the second offset distance. The race coupler wheels 92, 94, extend over the inner race edge 59 with the first coupler wheel 92 on the top surface 57 of the race and the second coupler wheel 94 on the bottom surface 67 of the race. The two coupler wheels pinch the race as they rotate around the race, and around the drive shaft length axis 45, or the drive shaft rotation axis. The race linkages 80, 80' couple with the propellers 20, 20' respectively, and rotate the propellers 20, 20' about their length axis 25, 25'. The race linkage has a cam 88 that couples with the propeller coupler 42 to rotate the propeller about the length axis. As the offset distance changes, as the race couplers and race linkage move around the race, the race linkage forces the cam to move, which forces the propeller couplers 42, 42', and thereby the propellers 20, 20' to rotate about their respective length axis 25, 25'. The flexible race 50 has a housing 60 comprising a first housing portion 62 and second housing portion 64. As shown in FIG. 10, the race-end of the race linkage 80, is coupled with a race-coupler linkage 86 that has the race coupler attached thereto and a bearing 87 enables the race-coupler linkage to pivot or rotate as the wheels 92 roll along the race from a first portion to 52 to a second portion 54. The housing has a deflector coupler 66, for coupling with the race deflector 70. As the race deflectors move up or down along the length axis of the drive shaft, the race deflector moves the race housing and thereby changes the offset distance of the race linkage. As shown in FIG. 20, the flexible race is hinged comprising a pair of hinges 69, 69' on either side of the race transition portion 55. The hinges allow the race to flex between a first race portion 52 and second race portion 54.

Referring now to FIGS. 13 to 16, an exemplary race assembly 51 comprises a flexible race 50, such as a ring-shaped metal band that flexes to transition from a first race portion 52 to a second race 54 portion over a race transition portion 55. The race housing 60 has a first housing portion 62 and second housing portion 64 which may be rigid, thereby retaining the flexible race at an offset distance over the radius of attachment with the flexible race. A race assembly may have any number of race housing portions. As shown in this exemplary embodiment, the race assembly has two race housing portions, thereby enabling a single transition from a first to second offset distance in one revolution around the race. The race housing 60 has a deflector coupler 66 for coupling with the race deflector (not shown).

Figure 17:
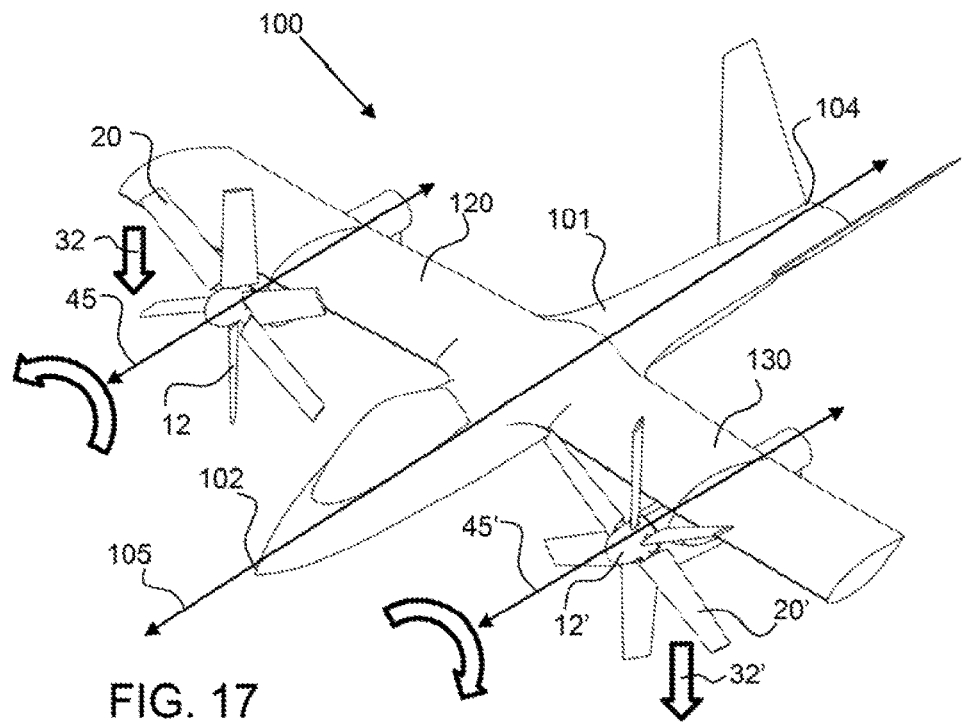
FIG. 17 shows a perspective view of an exemplary variable thrust aircraft having two variable pitch propeller apparatus oriented in a forward direction from the wings, or with the drive shaft extending forward from the wings.

As shown in FIG. 17, an exemplary variable thrust aircraft 100 has two variable pitch propellers 12, 12' oriented in a forward direction from the wings, a right wing 120 and a left wing 130, or with the drive shaft axis 45, 45' extending forward from the wings, or generally parallel with the length axis 105 of the variable thrust aircraft. The aircraft body 101 has a length from a front 102 to a back 104 along a length axis 105. The propeller pitch angle changes as the propellers spin. The propellers 20, 20' are producing a downward thrust 32, 32', as they spin, as indicated by the bold downward pointing arrows. The propeller has a relatively large positive pitch angle as they rotate downward and a small pitch angle as the rotate to produce backward thrust and propel the aircraft forward. With the variable pitch propeller, the aircraft can be propelled forward and upward, thereby enabling the aircraft to have a short runway take-off. In an exemplary take-off method, Phases 2 and 3 in that order are required to perform the take-off and forward flight.

Figure 18:
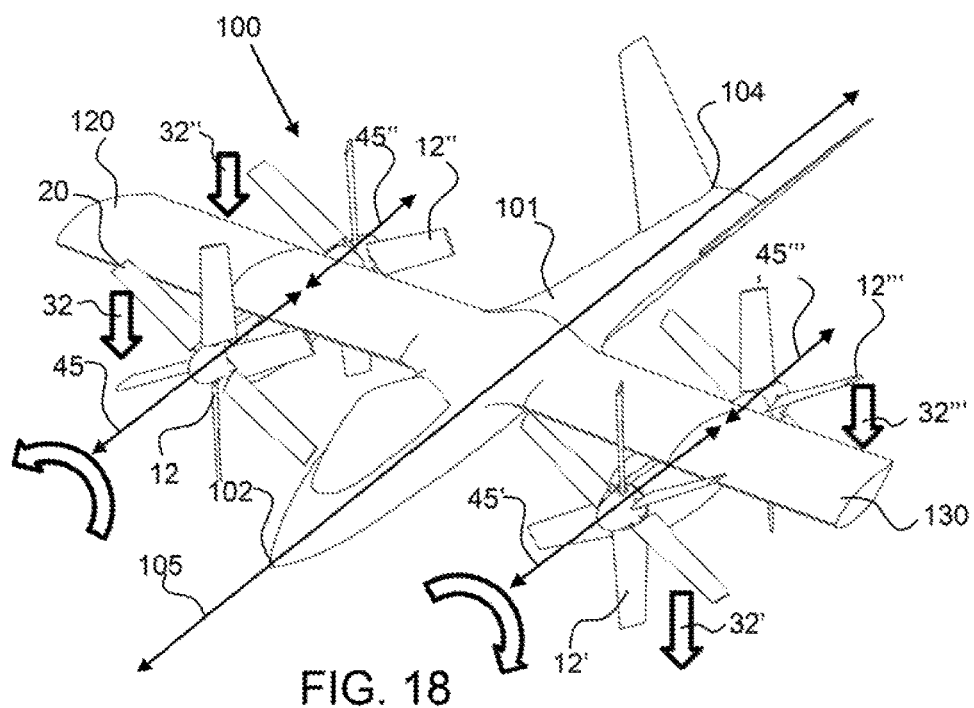
FIG. 18 shows a perspective view of an exemplary variable thrust aircraft having two variable pitch propeller apparatus on each wing, one in a forward direction from the wing and one in a backward direction from the wing.

As shown in FIG. 18, an exemplary variable thrust aircraft 100 has two variable pitch propellers 12 on each wing. Each of the right wing 120 and left wing 130, have a variable pitch propeller apparatus in a forward direction 12, 12' from the wing and one in a backward direction from the wing 12", 12'". Each of the variable pitch propeller apparatus has a drive shaft length axis that is substantially aligned with the length axis 105 of the aircraft. This exemplary variable thrust aircraft may operate with the two forward variable pitch propeller apparatus 12, 12', or variable pitch propellers forward of the wings, producing a downward thrust and upward lift, and with the two backward variable pitch propeller 12", 12'", producing downward thrust and upward lift of the aircraft. This type of arrangement may be ideal for vertical take-off and landing. Hovering could be controlled through power inputs to the variable pitch propeller apparatus. Simultaneously, rearward thrust could propel the craft into forward flight until the speed is sufficient for the wings to take over. All portions of the variable pitch propeller apparatus could generate rearward thrust for a standard fixed wing type of forward flight. The phases described are 1, 2 and 3 in that order.

Figure 19:
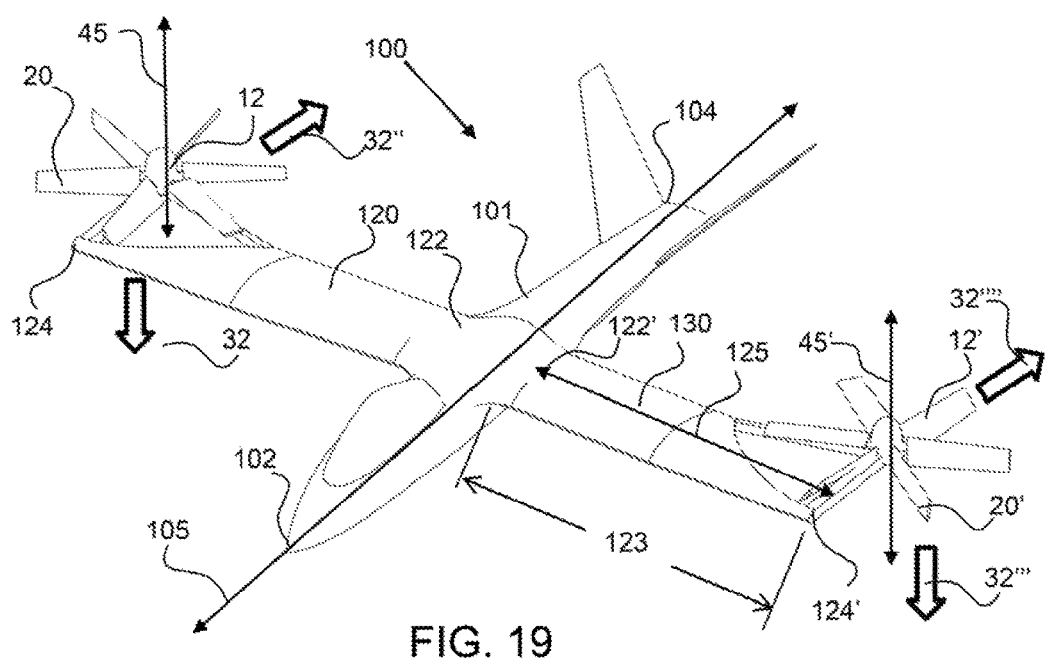
FIG. 19 shows a perspective view of an exemplary variable thrust aircraft having two variable pitch propeller apparatus oriented in an upward direction from the wings, or with the drive shaft extending upward or vertical from the wings.

As shown in FIG. 19, an exemplary variable thrust aircraft 100 has two variable pitch propellers 12, 12' oriented in an upward direction from the wings 120, 130, respectively, or with the drive shaft axis 45 extending upward, or vertically from the wings. The variable pitch propellers are configured at the extended ends 124 of the wings. The wings have a length 123 and length axis 125 that extends from a connected end 122 to the extended end 124. The variable pitch propellers are configured to provide downward thrust 32, 32'", and/or backward thrust 32", 32"", as indicated by the bold arrows. The variable pitch propellers could be configured along the length of the wings, versus at the extended ends. This craft utilizes Phases 3, 2 and 1 in that order to take-off and land vertically and transition to forward flight.

As shown in FIG. 20, an exemplary variable pitch propeller apparatus 12 has a hinged race comprising a pair of hinges 69, 69' on either side of the race transition portion 55. The hinges allow the race to bend over the transition portion from the first race portion 52 to the second race portion 54. The pair of race coupler wheels 92 and 94 pinch the race 50 and roll along the race as it transitions from a first offset distance to a second offset distance or first race portion 52 and second race portion 54. The propellers 20, 20' are rotated about the length axis 25, 25' as they rotate.

Figure 21:
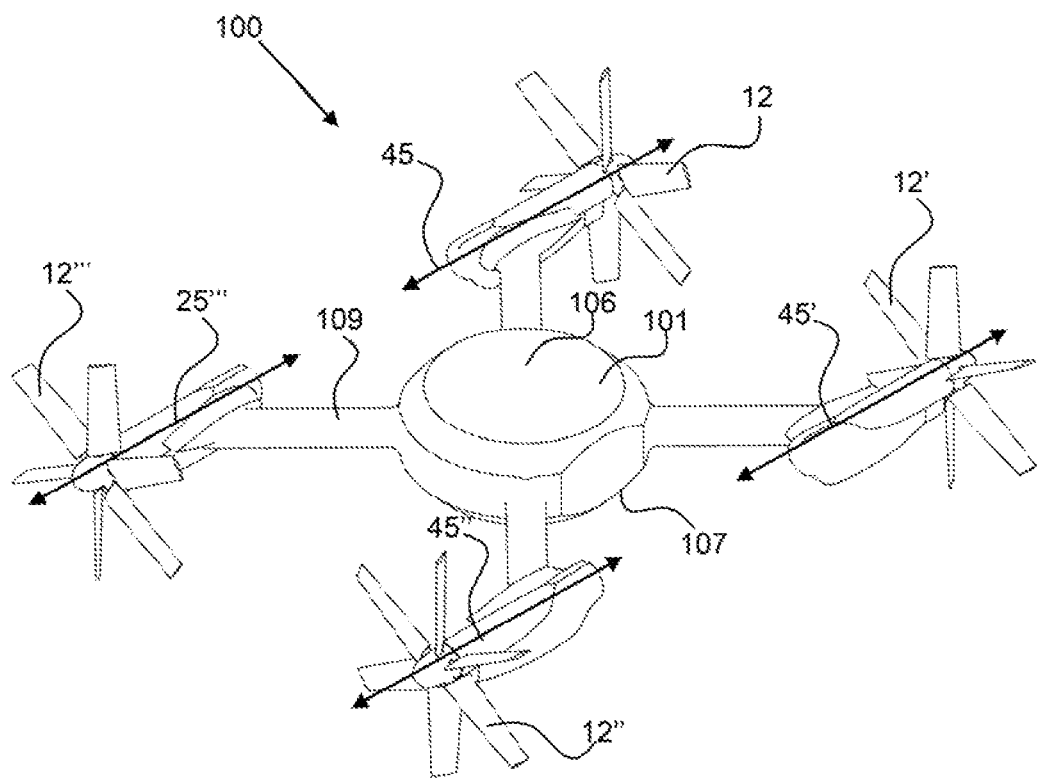
FIG. 21 shows a perspective view of an exemplary aircraft having four exemplary variable pitch propeller apparatus.

As shown in FIG. 21, an exemplary aircraft 100 has four exemplary variable pitch propeller apparatus 12-12''' on the extended end of propeller extension 109. The length axis 45-45''' of the drive shaft of the variable pitch propeller apparatus are in plane with each other, the length axis 45, 45''' of variable pitch propeller apparatus 12 and 12''' being substantially aligned with each other and the length axis 45', 45'' of variable pitch propeller apparatus 12' and 12'' being substantially aligned with each other. The drive shaft length axis extends substantially in a horizontal plan with respect to the top 106 and bottom 107 of the aircraft body 101. The four variable pitch propeller apparatus are configured in a four-corner configuration, with a variable pitch propeller apparatus located on each of four corners of a rectangle or square. This craft utilizes Phase 1 for take-off and landing and Phase 2 for forward flight.

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:
1. A variable pitch propeller apparatus comprising:
a) a drive shaft that rotates about a drive shaft length axis;
b) a plurality of propellers, each propeller comprising:
   i) a coupled end that is coupled to said drive shaft;
   ii) an extended end;
   iii) a length from the coupled end to the extended end;
   iv) a first side; and
   v) a second side;
   wherein each of the plurality of propellers has a propeller length axis that extends along a length of the propeller from perpendicularly to a length and rotational axis of the drive shaft;
c) a flexible circular race extending around the drive shaft that is actuated to change an offset distance comprising:
   i) a first portion at a first offset distance to the propeller length axis;
   ii) a second portion at a second offset distance to the propeller length axis;
d) a race deflector coupled with the flexible race to move said flexible race to change said offset distance;
   wherein the offset distance is a distance that extends parallel to the drive shaft length axis from the race to the length axis of the one of said propellers;
e) a race-linkage between the circular race and the propeller comprising:
   i) a race end; and
   ii) a propeller end;
   wherein the race end is coupled with the race and traverses along the circular race ring as the propeller rotates;
   wherein the propeller end is coupled with the propeller and rotates the propeller about the propeller length axis when the offset distance changes about the race.

2. The variable pitch propeller apparatus of claim 1, wherein the first and second offset distances are the same.

3. The variable pitch propeller apparatus of claim 1, wherein the race end of the linkage comprises a wheel that rolls along the race.

4. The variable pitch propeller apparatus of claim 1, wherein the flexible race is a ring shaped race having an inner edge, a circumference, a top surface and a bottom surface, wherein the top surface is proximal to the plurality of propellers.

5. The variable pitch propeller apparatus of claim 4, where the race end of the linkage has a first wheel configured on a top surface of the race and a second wheel on the bottom surface of the race.

6. The variable pitch propeller apparatus of claim 4, comprising at least three race deflectors configured around the circumference of the race ring.

7. The variable pitch propeller apparatus of claim 1, further comprising a propeller coupler, wherein the propeller end is attached to the propeller coupler and moves the propeller coupler that then rotates the propeller about the propeller length axis.

8. The variable pitch propeller apparatus of claim 1, wherein the propeller is rotated at least 90 degrees about the length axis of the propeller when moving from the first to the second portion of the circular race ring.

9. The variable pitch propeller apparatus of claim 1, wherein the propeller is rotated at least 180 degrees about the length axis of the propeller when moving from the first to the second portion of the circular race ring.

10. The variable pitch propeller apparatus of claim 1, comprising at least two race deflectors configured around the perimeter of the race ring.

11. The variable pitch propeller apparatus of claim 1, wherein the race deflector comprises a race linkage member extending from an actuator end, coupled with a race actuator, to a race end, coupled with the flexible race.

12. The variable pitch propeller apparatus of claim 11, wherein the race actuator is a servo motor.

13. A variable thrust aircraft comprising:
a) an aircraft body having an aircraft body length axis from a front to a back of the aircraft body;
   wherein the front of the aircraft body is in a forward location of the aircraft; and
   wherein the back of the aircraft body is a backward location of the aircraft;
b) a pair of wings that extend out from opposing sides of the aircraft body, each wing comprising:
   i) a top surface;
   ii) a bottom surface; and
   iii) a length extending along a wing length axis from a connected end with the aircraft body to an extended end;
c) a variable pitch propeller apparatus coupled to each of the pair of wings and comprising:
   i) a drive shaft that rotates about a drive shaft length axis;
   ii) a plurality of propellers, each propeller comprising:
      a coupled end that is coupled to said drive shaft;
      an extended end;
      a length from the coupled end to the extended end;
      a first side; and
      a second side;
      wherein each of the plurality of propellers has a propeller length axis that extends along a length of the propeller from perpendicularly to a length and rotational axis of the drive shaft;
   iii) a flexible circular race extending around the drive shaft that is actuated to change an offset distance comprising:
      a first portion at a first offset distance to the propeller length axis; and a second portion at a second offset distance to the propeller length axis;

iv) a race deflector coupled with the flexible race to move said flexible race to change said offset distance;

wherein the offset distance is a distance that extends parallel to the drive shaft length axis from the race to the length axis of the one of said propellers;

v) a race-linkage between the circular race and the propeller comprising:
a race end; and
a propeller end;
wherein the race end is coupled with the race and traverses along the circular race ring as the propeller rotates;
wherein the propeller end is coupled with the propeller and rotates the propeller about the propeller length axis when the offset distance changes about the race.

14. The variable thrust aircraft of claim 13, wherein the drive shaft of the variable pitch propeller apparatus extends forward from the wings.

15. The variable thrust aircraft of claim 14, wherein the first offset distance rotates the plurality of propeller to create a downward thrust and an upward lift of the aircraft around a portion of the race and wherein the second offset distance rotates the plurality of propellers at least 90 degrees from a rotation position when at the first offset distance.

16. The variable thrust aircraft of claim 13, wherein the drive shaft of the variable pitch propeller apparatus extends upward from the wings.

17. The variable thrust aircraft of claim 16, wherein the first offset distance rotates the plurality of propeller to create a downward thrust and an upward lift of the aircraft around a portion of the flexible race and wherein the second offset distance rotates the plurality of propellers at least 90 degrees from a rotation position when at the first offset distance.

18. The variable thrust aircraft of claim 13, comprising a pair of variable pitch propeller apparatus coupled to each of the pair of wings.

19. The variable thrust aircraft of claim 18, wherein on each of the pair of wings, the drive shaft of a first variable pitch propeller apparatus extends forward from, the wing and a second variable pitch propeller apparatus extends backward from the wing.

20. A variable thrust aircraft comprising:
a) an aircraft body having
b) a variable pitch propeller apparatus coupled to the aircraft body and comprising:
i) a drive shaft that rotates about a drive shaft length axis;
ii) a plurality of propellers, each propeller comprising:
a coupled end that is coupled to said drive shaft,
an extended end;
a length from the coupled end to the extended end;
a first side; and
a second side;
wherein each of the plurality of propellers has a propeller length axis that extends along a length of the propeller from perpendicularly to a length and rotational axis of the drive shaft;
iii) a flexible circular race extending around the drive shaft that is actuated to change an offset distance comprising:
a first portion at a first offset distance to the propeller length axis,
a second portion at a second offset distance to the propeller length axis;
iv) a race deflector coupled with the flexible race to move said flexible race to change said offset distance;
wherein the offset distance is a distance that extends parallel to the drive shaft length axis from the race to the length axis of the one of said propellers;
v) a race-linkage between the circular race and the propeller comprising:
a race end; and
a propeller end;
wherein the race end is coupled with the race and traverses along the circular race ring as the propeller rotates;
wherein the propeller end is coupled with the propeller and rotates the propeller about the propeller length axis when the offset distance changes about the race.

21. The variable thrust aircraft of claim 20, wherein the aircraft body is centrally located between a plurality of variable pitch propeller apparatus.

22. The variable thrust aircraft of claim 21, wherein the plurality of variable pitch propeller apparatus are coupled to the aircraft body by propeller extensions.

23. The variable thrust aircraft of claim 22, comprising four variable pitch propeller apparatus, wherein the drive shaft length axis of each of the plurality of variable pitch propeller apparatus extends horizontally with respect to a top and a bottom of the aircraft body.

24. The variable thrust aircraft of claim 23, wherein the plurality of variable pitch propeller apparatus are configured in a four-corner configuration.

* * * * *